Dec. 26, 1967  A. L. CLEVELAND  3,359,887
PORTABLE AND COLLAPSIBLE GRILL
Filed March 12, 1965
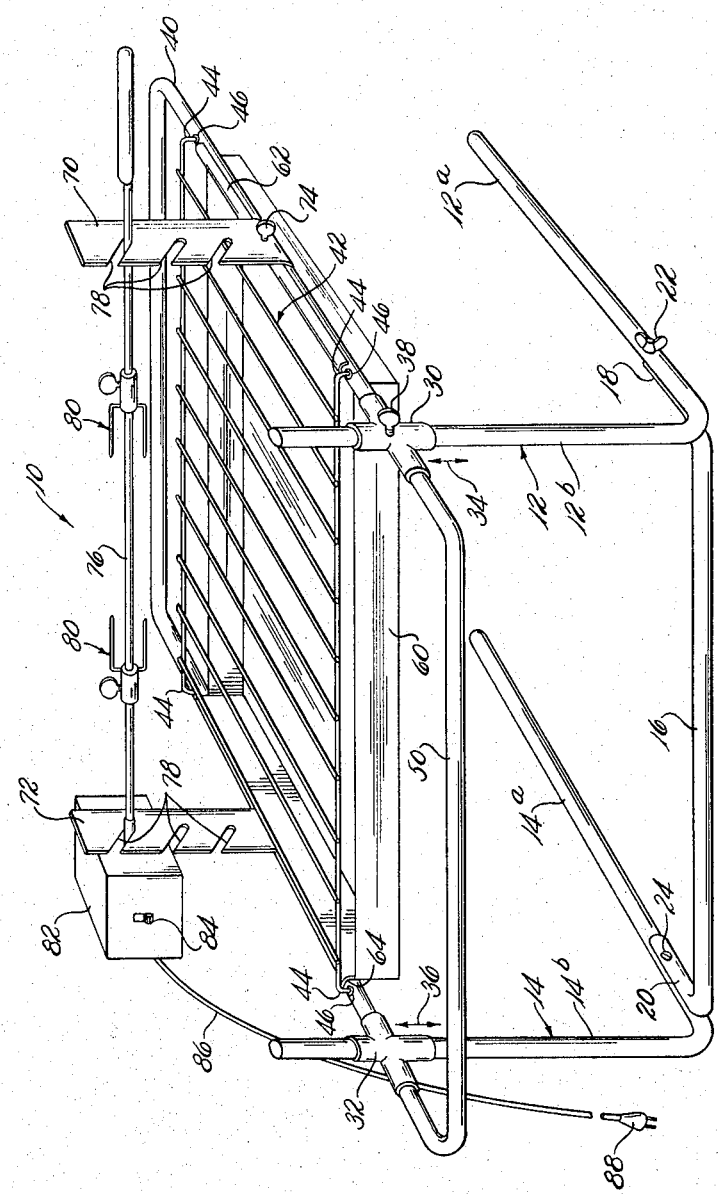
INVENTOR.
ALDIS L. CLEVELAND
BY Oldham & Oldham
ATTYS.

United States Patent Office 3,359,887
Patented Dec. 26, 1967

3,359,887
PORTABLE AND COLLAPSIBLE GRILL
Aldis L. Cleveland, Rte. 7, Box 75A,
Medina, Ohio 44256
Filed Mar. 12, 1965, Ser. No. 439,351
3 Claims. (Cl. 99—421)

This invention relates to a portable and collapsible grill, and more particularly to a grill having adaptability to a fireplace with ready adjustability of the grill relative to the fire, and which can be further adapted to carry a charcoal pan and/or a rotisserie unit.

Heretofore the idea of having a portable grill for outdoor cooking has been rather well known. Also, there have been many types of grills provided that are adaptable for indoor or outdoor fireplaces. However, nothing has really been done to combine these two features into a single portable and collapsible grill unit. These prior art units, in many instances as operatively used, have not been readily adjustable to allow ready control while cooking food on the grill. Further, many of these prior art grills are generally not sturdy enough, nor readily adjustable enough to facilitate the art of fireplace cooking over a grill.

Therefore, it is the general object of the present invention to avoid and overcome the foregoing, and other difficulties of and objections to prior art practices, by the provisions of a portable and collapsible grill which is very sturdy, readily adjustable during operation, and which may also be provided with its own fireplace pan and rotisserie, as desired.

A further object of the invention is to provide a grill mounted in adjustable relationship to supporting legs where the grill contains a handle extending between the legs, and the legs have a supporting bracket therebetween so that adjustment of the grill by the handle while holding the support legs in position by placing one's foot on the bracket therebetween becomes a very simple operation.

A further object of the invention is to provide a grill wherein a charcoal pan may be quickly and removably associated therewith, and a rotisserie may be quickly and removably mounted over the grill.

A further object of the invention is to provide a grill which is portable and adaptable to an indoor or outdoor fireplace and which further may be readily disassembled to a convenient packaged position.

The aforesaid objects of the invention, and other objects which will become apparent as the description proceeds, are achieved by providing in a portable grill the combination of a pair of L-shaped tubular support frames, a cross brace holding the support frames in spaced parallel relation with one leg thereof in a substantially horizontal plane and the other leg in a substantially vertical plane, a carrying frame mounted to the vertically directed legs of the support frames in vertically adjustable relation thereto and being substantially parallel and in alignment with the horizontal legs of the support frames, a forwardly directed handle connected to the carrying frame, and a grill removably mounted to the carrying frame.

For a better understanding of the invention reference should be had to the drawing which is a perspective view of an assembled portable grill comprising a preferred embodiment of the invention.

With reference to the form of the invention illustrated in the drawing, the numeral 10 indicates generally a portable and collapsible grill comprising a pair of L-shaped support frames or braces, indicated generally by numerals 12 and 14, which contain essentially horizontal legs 12a and 14a and vertical legs 12b and 14b, respectively. In order to hold the frames, or braces 12 and 14 in fixed relationship to each other, a cross brace or support bracket 16 having end portions 18 and 20 bent to conform to the horizontal legs 12a and 14a is removably fixed into position by bolts with associative wing nuts 22 and 24, respectively. The invention contemplates that the cross brace 16 will hold horizontal legs 12a and 14a in essentially parallel spaced relationship while maintaining the vertical legs 12b and 14b in vertical parallel spaced relationship, and usually the support frames 12 and 14 and cross brace 16 are tubular and light in weight while still being quite rigid.

In order to provide adjustable grill features to the apparatus, four legged unions 30 and 32 are slidably mounted on the vertical legs 12b and 14b to be adjustable in the vertical direction indicated by arrows 34 and 36, respectively, with each union 30 and 32 being held in fixed position with respect to its leg 12b or 14b by an appropriate locking wing nut 38, as seen associated with the union 30. Connected to the rearward leg or joint of the unions 30 and 32 is a tubular carrying frame 40 which is of a substantially rectangular shape in plane view, and is generally a little longer than the horizontal legs 12a and 14a, for example between about 3 to about 6 inches.

A grill, indicated generally by numeral 42, has hooked end portions 44 removably received in holes 46 through the top of the carrying frame 40. The invention contemplates that the holes 46 will be in uniform relation on each side of the frame 40, but spaced slightly wider apart than the legs 44 of the grill 42 so that such legs 44 must be bent slightly outwardly in a tensioned relationship when received into the holes 46. Such tensioned relationship insures a tight fit of the grill 42 onto the top of the carrying frame 40.

In order to permit easy and convenient adjustment of the grill 42 relative to the ground, a handle 50 is fixedly connected to the forwardly directed legs or joints of the unions 30 and 32, so that such handle 50 lies in essentially the same plane as the carrying frame 40, but extends perhaps 3 to 6 inches in front of the vertically directed legs 12b and 14b. This handle 50 serves a very useful purpose for adjusting the carrying frame 40, since one can position his foot on the cross brace 16 while holding the handle 50 with one hand and loosening the wing nuts 38. The handle 50 then allows very secure and easy adjustment of the carrying frame 40 by using both hands on the handle 50 with at least one foot placed on the cross brace 16 to thereby adjust the unions 30 and 32 vertically upward or downward as by the arrows 34 and 36. The positioning of one foot on the cross brace 16 stabilizes the entire grill during adjustment of the carrying frame 40. Of course, when the proper adjusted position has been determined, the wing nuts 38 will again be tightened to hold the unions 30 and 32 in position. Such adjustability of the frame 40 permits food to remain on the grill 42 even during such adjustment without any possibility of tipping or spilling thereof. The positive action is attained because two hands can be used on the handle 50 while holding the entire unit in fixed relationship by placing the foot on the cross brace 16.

Other desirable attachable features to the basic frame unit include a charcoal tray 60 which has a curved lip 62 or 64 at each side thereof adapted to slide in hooked relationship over the side bars of the carrying frame 40 inbetween the hooked ends 44 of the grill 42. The tray 60 may contain charcoal, or other suitable material to provide a fire for cooking food on the grill 42.

Also, a pair of side braces 70 and 72 may be removably attached to the carrying frame 40 by suitable means such as arcuate upwardly open foot sections engaging the frame and attached thereto by suitable wing nuts 74, or the like to rotatably support a rotisserie rod 76 slidably received in adjustable relationship by a plurality of slots, indicated generally by numeral 78. The plurality of slots 78 allows the rod 76 to be positioned at various heights over the grill 42 or pan 60. Suitable holding forks 80 are adjustably received on the rod 76, while a rotisserie motor 82 actuated by a switch 84 and powered by a cord 86 with plug 88 is also provided. The motor 82 is adapted to rotate the rotisserie rod 76 and preferably be mounted in adjustably but fixed relationship to the bracket 72.

The invention contemplates that all the parts comprising the specific embodiment of the invention illustrated in the drawing are detachable from each other, preferably by wing nuts, or else in slidable relationship, so that the entire apparatus may be broken down into a small package-like form with most of the parts received in the pan or tray 60. Then, a suitable carrying case might be provided to insure a neat packaged assembly for the entire unit. The actual packaging procedure does not comprise a part of this invention, yet the fact that the apparatus may be readily disassembled down to a package form is a unique aspect of my novel portable grill. The invention further contemplates that the tubular base frames and carrying frames will be made from a suitable steel, for example stainless or with a suitable plating, so that rusting will not occur. The unions 30 and 32 might appropriately be made from aluminum, or other non-rusting material. The durability and strength of the structure is an important feature to allow large pieces of meat to be placed on the grill while still maintaining good stability. Preferably, the horizontal legs 12a and 14a will not extend as far as the end of the carrying frame 40 so that the unit might be positioned in operative association with a conventional fireplace grill of an indoor or outdoor fireplace and have the carrying frame positioned thereover.

Thus, it is seen that the objects of the invention have been achieved by providing a portable and collapsible grill which is easily and positively adjustable even while carrying food in a cooking position. Such adjustability is particularly desirable if utilized with an open fire without the pan 60 so that initially the grill may be positioned in considerable spaced relation relative to the fire while it is hot, and subsequently moved downwardly as the fire cools down so as to maintain an even and continuous heat throughout a cooking process.

While in accordance with patent statutes only one best known embodiment of the invention has been illustrated and described in detail, it is to be particularly understood that the invention is not limited thereto or thereby, but that the inventive scope is defined in the appended claims.

What is claimed is:

1. In a portable grill the combination of
a pair of support braces each having a horizontal leg and a vertical leg,
separate brace means removably connecting to and extending between the forward portions of the horizontal legs of the support braces to position them in spaced parallel relation,
a carrying frame slidably and adjustably mounted to the vertical legs of the support braces extending in the same direction and in substantially parallel relation to the horizontal legs of the support braces, said carrying frame being longer than the support braces,
a support bar and handle counted in fixed relation to the carrying frame extending forwardly therefrom in substantially parallel relation to the separate brace means,
a grill removably mounted in horizontal relation on the carrying frame,
a pan removably mounted in horizontal relation to the carrying frame beneath the grill, and
a rotisserie adjustably mounted in horizontal relation to the carrying frame over the grill.

2. In a portable grill the combination of
a pair of two legged L-shaped support frames,
a cross brace holding the support frames in spaced parallel relation with one leg of each in a substantially horizontal plane and the other leg in a substantially vertical plane with respective legs in substantially parallel relation,
a carrying frame mounted on the vertically directed legs of the support frames in vertically adjustable relation thereto and substantially parallel and in alignment with the horizontal legs of the support frames,
a forwardly directed handle connected to the carrying frame,
a grill removably mounted on the carrying frame,
a charcoal pan removably attached to the carrying frame beneath the grill, and
a rotisserie unit adjustably mounted to the carrying frame above the grill.

3. In a portable grill the combination of
a pair of support braces each having a horizontal leg and a vertical leg,
separate brace means removably connecting the forward portions of the horizontal legs of the support braces in spaced parallel relation,
a union slidably mounted over each vertical leg of the support braces,
a carrying frame fixedly mounted to the unions and extending in the same direction and in substantially parallel relation to the horizontal legs of the support braces, said carrying frame being between about 3 to about 6 inches longer than the support braces,
a support bar and handle mounted in fixed relation to the unions and extending forwardly therefrom between about 3 to about 6 inches in substantially parallel relation to the separate brace means,
a grill removably mounted in horizontal relation to the carrying frame,
a pan removably mounted in horizontal relation to the carrying frame beneath the grill, and
a rotisserie adjustably mounted in horizontal relation to the carrying frame over the grill.

References Cited

UNITED STATES PATENTS

| | | | |
|---|---|---|---|
| 2,307,914 | 1/1943 | Bitney. | |
| 2,391,571 | 12/1945 | Hennessy | 99—421 |
| 2,477,529 | 7/1949 | Sprinkle et al. | |
| 2,498,853 | 2/1950 | Hassold et al. | |
| 2,523,641 | 9/1950 | Alvarez. | |
| 2,564,915 | 8/1951 | Nelson | 297—287 |
| 2,604,884 | 7/1952 | Walker | 126—30 |
| 2,608,149 | 8/1952 | Ellis | 99—421 |
| 2,608,190 | 8/1952 | Winning et al. | 126—9 X |
| 2,789,631 | 4/1957 | Vosbikian et al. | 248—188.91 |
| 2,900,897 | 8/1959 | Fisher | 126—9 X |

WALTER A. SCHEEL, *Primary Examiner.*

J. NEARY, *Assistant Examiner.*